Patented July 12, 1949

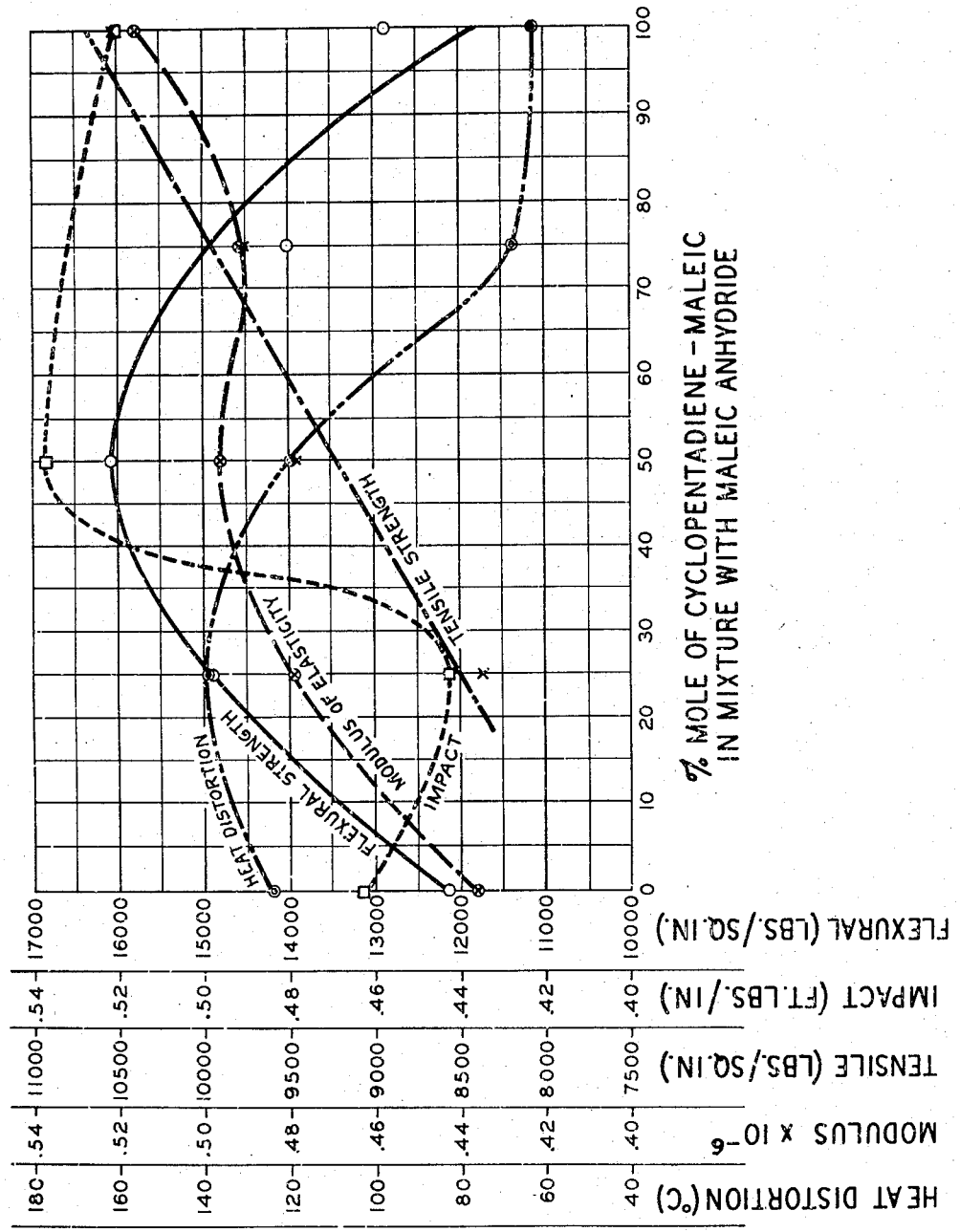

2,475,731

UNITED STATES PATENT OFFICE 2,475,731

COPOLYMERIZATION PRODUCTS OF STYRENE AND ADDUCT MODIFIED GLYCOL-MALEATE RESINS

George S. Weith, Caldwell, N. J., assignor to Bakelite Corporation, a corporation of New Jersey Application October 27, 1944, Serial No. 560,649

5 Claims. (Cl. 260—45.4)

This invention relates to resinous copolymerization products of vinyl compounds with polyhydric alcohol esters of a polybasic acid.

The esters by themselves are in general polymerizable to an infusible state provided one of the reactants is trifunctional; in this form they are known as alkyds and primarily useful in coating compositions. For this use they are in practice made from phthalic anhydride as the polybasic acid and include as well a monobasic fatty acid as a third reactant to impart oxygen-convertibility or air-drying; glycerol (trifunctional) is used as the polyhydric alcohol. When both the alcohol and the acid are bifunctional, such as glycol and phthalic anhydride, the esters prepared from them have found little or no practical utility on account of their permanent fusibility and solubility.

The restriction of the phthalic-glycerol alkyds to coatings or films is due to the extreme slowness with which they harden or convert to the solid state; if cast into solids of appreciable thickness, they are converted to bubble-free articles only with difficulty and with prolonged heating over a period of months, and even then articles of thick cross-sections have a tendency to flow into shapeless masses on long standing. Accordingly it has been proposed to interpolymerize or copolymerize the esters with vinyl compounds to provide a cross-linkage and so impart convertibility upon heating into useful solids; it has further been proposed to use esters made from an ethylene-alpha-beta-dicarboxylic acid (particularly maleic anhydride) in place of phthalic anhydride for copolymerization with vinyl compounds, since such copolymerization products have been indicated as having a rate of hardening upon heating that lends them to molding operations. The reaction, however, of a glycol-maleate with styrene, for example, is very violent, and the products are characterized by extreme rigidity.

It has now been found that a surprisingly effective reaction control and hardenable products having markedly improved physical properties in the hardened condition can be obtained by causing an ester-forming reaction of a glycol (ethylene, di- and tri-ethylene, tri-methylene, propylene, etc. glycol) with a mixture of an olefine-alpha-beta-dicarboxylic acid (maleic, fumaric, citraconic, itaconic, etc., including their anhydrides) and a diolefine-maleic adduct (reaction product of maleic anhydride and a diolefine, such as butadiene, isoprene, piperylene, a terpene, etc.), and reacting the polyester so formed with an alpha-substituted ethylene compound (styrene, vinyl acetate, acrylic and methacrylic acids, etc.). The preferred adducts are the cyclopentadiene-maleic reaction product and the hydrogenated products of that adduct; cyclopentadiene in itself can serve as a cross-linking agent, and this property may account for the effectiveness of the adduct addition. Styrene has been found particularly useful as a copolymerizing agent for reaction with the polyester, and is preferred for that reason; in this association it has been found that propylene glycol as the ester-forming glycol promotes miscibility of the polyester and styrene.

Proportions of the acid reactants do not appear critical; the most useful products, however, seem to be those in which the polyester is made with the adduct constituting about 25 to 75 per cent (on a molar basis) of the acid mixture. As the examples which follow show, the glycol is added in amount to supply an equivalence of hydroxyl and carboxyl groups in order to obtain the polyester reaction. For copolymerization with the ester as little as 5 per cent (by weight of the total composition) of styrene or other alpha-substituted ethylene compound is effective for cross-linking, and since styrene in itself is polymerizable, there is no upper limit to the amount included; in general, moreover, the cross-linking agent is volatilizable, and therefore precaution is to be taken to prevent or to compensate for losses caused by evaporation.

To demonstrate the unexpected improvements that follow from a combination of a dibasic acid and an adduct of a dibasic acid for preparing a polyester and the copolymerization of the ester with a vinyl compound, a series of comparative experiments were run, using maleic anhydride and cyclopentadiene-maleic anhydride adduct in varying proportions as the acid combination and propylene glycol as the alcohol for making the ester; each ester was then mixed with the same proportion by weight of styrene and the mixtures were molded by casting and baking. The curves in the accompanying drawing show the changes in physical properties of the cast pieces with varying proportions of the adduct.

For these experiments, one ester was made by reacting equal molar proportions of propylene glycol and maleic anhydride over a period of 5.5 hours with the temperature gradually rising to 212° C.; the mass was cooled to 140° C. and poured, and the product was a viscous liquid with an acid number of 17.8. (The acid number is a convenient means for following the progress of the reaction and determining the degree of condensation.) A second ester was prepared in the proportions of about 1 mol of propylene glycol, 0.25 mol of maleic anhydride and 0.75 mol of the adduct by heating over a period of a little over 5 hours up to about 220° C.; the product had an acid number of 25.6 and a melting point of 81° C. A third ester was made in the proportions of 1 mol of propylene glycol and 0.5 mol each of maleic anhydride and the adduct; by heating over a period of a little over 7 hours and to a temperature maintained around 200 to 220° C. to yield a product with an acid number of 25.7 and a melting point of 77° C. A fourth ester was made from equal molar proportions of propylene glycol and the adduct alone by reacting over a period of a little over 7 hours at 180 to 220° C. to an acid number of 24.6; it had a melting point of 95° C. Casting syrups were prepared from each of the esters by charging a flask with styrene and adding the ester in the ratio (by weight) of 65 per cent ester to 35 per cent styrene while vigorously agitating at 40 to 60° C. until a homogeneous liquid was formed; about 0.005 per cent based on the total syrup of hydroquinone was included, and at the time of casting an accelerator (benzoyl peroxide) was added. Castings were made by pouring the syrups into lead molds and glass test tubes and holding at 60° C. in a water bath for about an hour to release bubbles; they were then baked in an oven for 24 hours each at 75°, 100° and 125° C. Good castings were obtained, with the exception of those from the first ester (propylene glycol-maleate) that cracked at 100° C. and no tensile tests could be made on them.

It is apparent from the curves that the best combination of properties in the castings was obtained with the 50 per cent maleic and 50 per cent maleic adduct ester composition; with this proportion the flexural strength was significantly greater than either the 100 per cent maleic or the 100 per cent adduct composition, the impact strength was the best, and the temperature reached before heat-distortion occurred was about as high as for the 100 per cent maleic though highest with the 75 per cent maleic and 25 per cent adduct composition. With increasing adduct content, the color and machineability improved, the shrinkage on curing became less, and the water resistance increased in the cast products.

In general the polyesters of this invention are prepared by charging the ingredients into a vessel and allowing the esterification to proceed quietly by heating initially to about 160° C. with the maintenance of a nitrogen atmosphere until the half ester is formed; the reaction proceeds easily at room temperature, but it takes place largely at about 160° C. with a marked evolution of heat and water. Then agitation is applied, as by a mechanical stirrer, and the temperature raised gradually to between 210° to 215° C., though the temperature may be held as low as 160° C., while the pressure is gradually reduced to about 20 mm. absolute. Upon the ester becoming frothy and stiff, it is cooled and poured; at this stage it has an acid number ranging from about 5 to 35 depending on the acids and the glycol used. The polyester is mixed with styrene or the like at room temperature, or the ester can be heated to about 80° C. and then mixed with styrene until uniform. The syrup is poured into molds to harden and this occurs with rapidity at temperatures of 60° C. and higher; for instance, a syrup containing styrene and from 0.5 to 5 per cent of polyester gels in about 15 to 20 minutes at 100° C. to a soft mass that can then be mixed with filler and then subjected to baking for hardening.

The following are representative examples of hardening compositions made by the foregoing procedure.

Example 1

| | Mol |
|---|---|
| Cyclopentadiene-maleic anhydride | ⅓ |
| Maleic anhydride | ⅔ |
| Diethylene glycol | 1 | were reacted to an acid number of 10. About 50 parts by weight of the polyester were mixed with 27 parts of styrene and poured into rod molds for curing at 80° C. The rods were practically clear and of good toughness and strength.

Example 2

| | Mol |
|---|---|
| Hydrogenated cyclopentadiene maleic anhydride | ⅔ |
| Maleic anhydride | ⅓ |
| Diethylene glycol | 1 | gave upon reaction a polyester with an acid number of 20. When 50 parts of the ester were mixed with 20 parts of styrene and 2 parts of dibutyl phthalate added and the mixture cast in rod molds and cured at 80° C., clear and good quality rods were obtained. Castor oil substituted in the same proportion for dibutyl phthalate gave cured rod castings that were clear and free from blemishes.

Example 3

| | Mol |
|---|---|
| Cyclopentadiene-maleic anhydride | ⅔ |
| Maleic anhydride | ⅓ |
| Ethylene glycol | 1 | when reacted gave a polyester with an acid number of 16. When about 50 parts of the ester were mixed with about 29 parts of styrene, clear hard rod castings resulted; and with about 0.15 per cent of benzoyl peroxide added as a catalyst, the soft gel, formed at room temperature and broken on rolls, molded into clear hard discs when subjected to about 135° C. and about 500 to 2000 pounds per square inch pressure for a brief period.

Example 4

The same ingredients and proportions as in Example 2, but substituting ethylene glycol for diethylene glycol, gave a polyester with an acid number of 37. This when cross-linked with twice its weight of styrene, containing a small amount of hydroquinone and benzoyl peroxide included as a catalyst, gave rod castings that showed but very little shrinkage. With but 4 parts of the ester to 100 parts of styrene clear rods were also formed but they showed some surface defects.

Example 5

The same maleic anhydride acid and adduct as in Example 2, but in the amounts of 0.45 mol and 0.55 mol respectively, were reacted with 0.5 mol each of ethylene glycol and propylene glycol to an acid number of 31. The ester was mixed with about an equal weight of styrene, and about 10 times its weight of carborundum abrasive grains #24 in size were added. Grinding wheels of 1 inch thickness and 10 inches in diameter were cast from the mixture; these were found satisfactory in speed and grinding tests. Equal weights of the ester and styrene without any added filler gave hard good quality rods that were rigid at 100° C.

*Example 6*

The same ingredients as in Example 5 but in the proportions of ⅓ mol of the adduct and ⅔ mol of maleic anhydride were reacted with diethylene glycol, and a mixture of equal parts by weight of the ester and styrene with benzoyl peroxide as catalyst was used to impregnate carbon tubes. The impregnated tubes after baking were non-porous and had good caustic, acid and solvent resistance.

In general the castings obtained have the advantages of strength, light stability, alkali resistance and water resistance, particularly with the higher ratios of styrene; the inclusion of the adduct type acid results in a decrease of the shrinkage that is objectionably high in products made without the adduct. When the polyester is mixed with styrene or the like, the reaction proceeds rapidly but at a controllable rate to soft gel stage, even on standing at room temperature in the presence of about 0.1 per cent of added catalyst; for instance, gelling of a composition containing about 35 per cent by weight of styrene in thin films occurs within ten minutes or so and in thick sections (in test tubes of five-eighth or three-quarter inch diameters) gelling takes place within one day, and the gel formation can be hastened by heating (preferably below 60° C. to release bubbles). The further curing to a hard solid is then accelerated by heating, for instance, at 80° C. for about 2 to 3 days or at 100° C. for about 1 day; but at these temperatures the hardening proceeds at a controllable rate to give uniform satisfactory castings. In contrast the hardening of a copolymer gel of a glycol-maleate (without any adduct addition) and styrene proceeds upon heating to such temperatures at a rate that generates heat to cause a temperature rise which in turn further speeds up the reaction to generate more heat with the result that in thick sections, the interior remains hot and the solidified exterior sticks and shrinks to form cracks and fans.

Besides the making of castings the compositions are useful as binders for fillers in making molding materials or laminates and as impregnants for porous materials.

What is claimed is:

1. Reaction product of styrene with a fusible polyester of one mol of a glycol and a molar mixture of maleic anhydride and cyclopentadiene-maleic adduct, said adduct constituting between 25 and 75 molar percent of the molar mixture, said polyester having an acid number between 5 and 35 and constituting between 5 and 71.5 percent by weight of the reaction product.

2. Reaction product of styrene with a fusible polyester having an acid number between 5 and 35, said polyester being the esterification product of one mol propylene glycol and a molar mixture of maleic anhydride and cyclopentadiene maleic adduct, said adduct constituting between 25 and 75 molar percent of the molar mixture, and said polyester constituting between 5 and 71.5 percent by weight of the reaction product.

3. Reaction product of styrene with a fusible polyester having an acid number between 5 and 35, said polyester being the esterification product of one mol propylene glycol and a molar mixture of 0.5 mol maleic anhydride and 0.5 mol cyclopentadiene maleic adduct, said styrene constituting substantially 35 percent by weight of the reaction product.

4. Process of preparing a hardening resinous product which comprises esterifying in equivalent amounts a mixture of maleic anhydride and cyclopentadiene maleic adduct, said adduct constituting between 25 and 75 molar percent of the mixture, by means of a glycol to a fusible resin having a low acid number between 5 and 35 and copolymerizing styrene with the product of esterification, the latter being in amount by weight between 5 and 71.5 percent of the resultant copolymer.

5. Process of preparing a hardening resinous product which comprises esterifying in equivalent amounts propylene glycol with equal molar proportions of maleic anhydride and cyclopentadiene-maleic adduct to form a fusible ester resin having a low acid number between 5 and 35 and copolymerizing styrene with the ester resin, the latter being in amount by weight between 5 and 71.5 percent of the resultant copolymer.

GEORGE S. WEITH.

REFERENCES CITED

The following references are of record in the file of this patent:

UNITED STATES PATENTS

| Number | Name | Date |
| --- | --- | --- |
| 2,255,313 | Ellis | Sept. 9, 1941 |
| 2,319,826 | Pellett | May 25, 1943 |
| 2,345,948 | Pellett | Apr. 4, 1944 |

OTHER REFERENCES

Kropa et al., Ind. Ing. Chem., vol. 31, pages 1512–1516, Dec. 1939.